INVENTOR.
THOMAS F. MASON
BY
Schapp & Hatch
ATTORNEYS

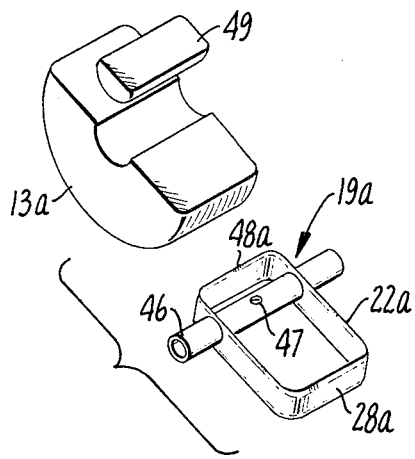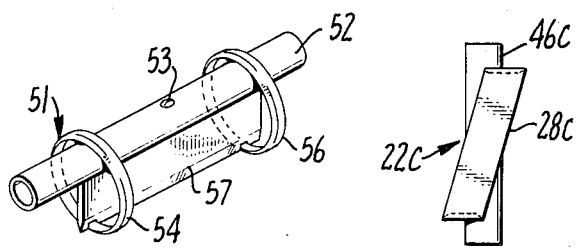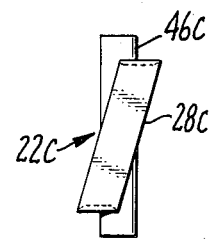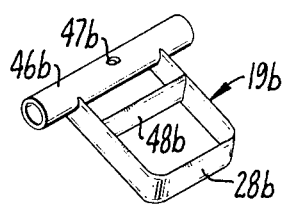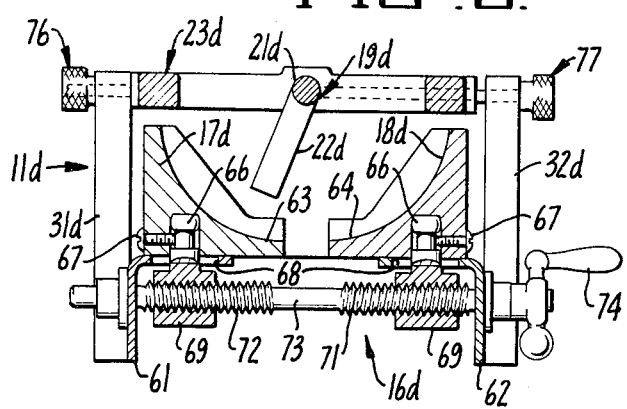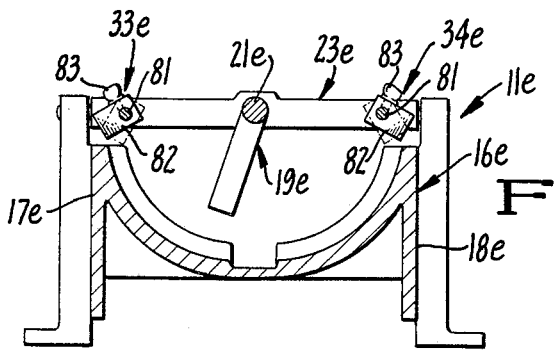

United States Patent Office 3,504,720
Patented Apr. 7, 1970

3,504,720
MACHINE FOR DISHING PINEAPPLES
AND THE LIKE
Thomas F. Mason, 175 San Rafael Way,
San Francisco, Calif. 94127
Filed Oct. 9, 1967, Ser. No. 673,799
Int. Cl. A23p 1/00; B26d 3/22
U.S. Cl. 146—6                                    14 Claims

ABSTRACT OF THE DISCLOSURE

A machine for dishing pineapples constructed with a cradle formed for holding a pineapple half cut side up, a frame pivotally attached to the cradle and formed to fit down over a pineapple half held in the cradle, with the frame carrying a cutter journaled therethrough for rotation around the long axis of the pineapple half and a blade carried on the cutter of a substantially U-shaped configuration adapted to rotate through the pineapple half and cut half discs therefrom to leave a hollowed out portion in the pineapple; the cutter blade is carried for longitudinal adjustment so that multiple cuts may be made for providing different sized cavities in the pineapple half, and certain alternate configurations allow for adjustment of the machine to accommodate different sized pineapple halves, for coring the pineapple, and other variations.

BACKGROUND OF THE INVENTION

The present invention relates to a machine for dishing pineapples and the like, and more particularly to a simple machine for hollowing out pineapple halves so that the pineapple halves may be used as a dish for other prepared foods.

Recently, it has become a very common practice to serve salads and other foods inside hollowed out pineapple halves and the like, and this practice has created a problem for the personnel who prepare the food. Specifically, it is very difficult to cut out pineapple halves with a knife, or to scoop it out with other tools by hand. In addition, it is important that the pineapple half be cut out so as to present an attractive piece, and this requires careful cutting. Moreover, the pineapple removed from the pineapple half is valuable food and is preferably removed in a form suitable for serving in other dishes.

It will also be appreciated that such pineapple halves or other dishes prepared from natural foods should be freshly prepared and that sophisticated production machinery is impractical for the purpose. In other words, each kitchen preparing food for restaurants or the like should be equipped with a machine so that the fresh pineapples and the like may be prepared on order, and therefore an inexpensive machine is desirable.

SUMMARY OF THE INVENTION

It is a primary object of the present invention to provide a simple machine capable of dishing out pineapples in a rapid and efficient manner and capable of providing an attractive dished pineapple half or the like.

Another object of the invention is to provide a machine of the character described, which is inexpensive to construct, and reliable and simple in operation.

A further object of the invention is to provide a machine of the character described which is not only capable of providing attractive hollowed out pineapple halves or the like, but is also capable of providing attractively cut pieces of fruit from the portion hollowed out.

Yet still another object of the invention is to provide a machine of the character described which is capable of adjustment whereby different sized pineapple halves may be accommodated at different times in the same machine.

Further objects and advantages of the invention will be apparent as the specification progresses, and the new and useful features of the machine for dishing pineapples and the like will be fully defined in the claims attached hereto.

These and other objects are obtained by the machine of the present invention which is constructed with a cradle formed for holding a pineapple half cut along the long axis of the pineapple, with the cut side up, and a rotatable cutting means carried for axial rotation with respect to the pineapple whereby a rotating cutter blade will cut half discs out of the pineapple. The cutting means is preferably mounted so that the cutting blade can be moved axially as well as rotated, thereby achieving flexibility in the size of the hollowed out portion. At the same time, this structure allows for variation of size and thickness of the half discs removed from the pineapple which are then suitable for other food preparations made from pineapple.

The machine may be constructed in various forms, with the cradle being made for accommodating a standard size in a simple case or made adjustable, if desired, to accommodate different sized pineapples. The cutting blade is also preferably supported on a frame which clamps the pineapple in position and at the same time orients the cutter blade as desired. The cutter blade may also contain a coring device or have various different configurations depending upon the demands of the particular machine.

A typical form of the machine embodying the invention, comprises a cradle having walls defining a concave configuration adapted to receive a pineapple half cut through the longitudinal axis thereof, a cutter having an elongated member adapted to lay axially of the pineapple and exceed the length thereof and a substantially U-shaped cutting blade attached to the elongated member in the central portion thereof and through the arms of the U-shaped blade, cutter mounting means carried on the cradle for movement between an out-of-the-way position suitable for placement of pineapple halves in the cradle and removal of same and an operative position in which the elongated member of the cutter lies substantially along the longitudinal axis of a pineapple half in the cradle, and means for axially rotating the elongated member so that the cutting blade moves in circular fashion through the pineapple and cuts out the portion of the pineapple defined by the cut face of the pineapple and the disc-shaped volume severed by the U-shaped blade as it rotates.

The cradle preferably serves as or includes a base and main body of the machine, and the cutter mounting means is preferably a frame pivotally mounted to the cradle and adapted to fit flush with side rails thereof while at the same time fitting substantially flush with the cut side of the pineapple half carried in the cradle. The cutter is preferably constructed with its elongated member in the form of a rod journaled to rotate in the frame and move axially therethrough so as to provide longitudinal positioning of the cutting blade as well as rotation. The means for axially rotating the cutter can be any suitable rotating means, but is a manually operated handle in order to provide a simplified device.

The various elements of the machine and the modifications that may be made within the scope of the invention will become more apparent from the specific description of the preferred embodiments and operation thereof given below.

BRIEF DESCRIPTION OF THE DRAWINGS

The preferred forms of the invention are illustrated in the accompanying drawings, forming a part of this description, in which:

FIGURE 4, shows an alternate form of cutting blade that may be utilized in the embodiment shown in FIGURES 1 through 3, and the appearance of a cut portion of pineapple which would be removed by said blade;

FIGURE 5, a perspective view of a coring device that may be utilized in the machine of the invention;

FIGURE 6, a plane view of still another form of cutter that may be utilized and a device constructed according to the invention;

FIGURE 7, an elevational view of the cutter shown in FIGURE 6;

FIGURE 8, a perspective view of still another form of cutter that may be used in a device constructed according to the invention;

FIGURE 9, a cross-sectional view of an alternate form of the device shown in FIGURES 1 through 3 with the view being similar to that of FIGURE 3, but on the modified device; and FIGURE 10, a cross-sectional view similar to the view shown in FIGURE 9, but illustrating still another modified form of a machine constructed in accordance with the invention.

While only the preferred forms of the invention are shown, it should be understood that various changes or modifications may be made within the scope of the claims attached hereto without departing from the spirit of the invention.

DESCRIPTION OF THE PREFERRED EMBODIMENTS

Figure 1:
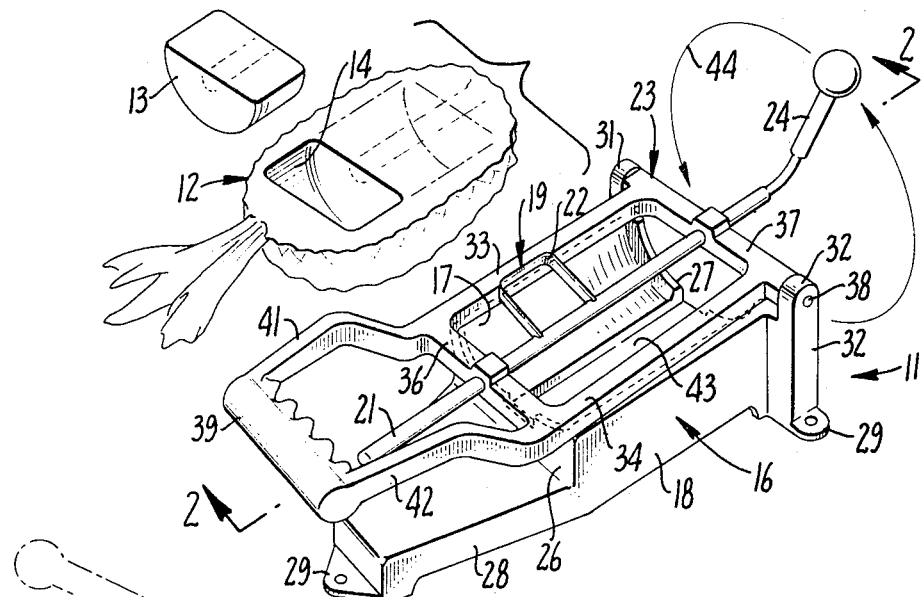
FIGURE 1 is a perspective view of a preferred embodiment of the invention, which also illustrates the manner in which a pineapple half is dished and a typical portion of pineapple cut therefrom.
Figure 2:
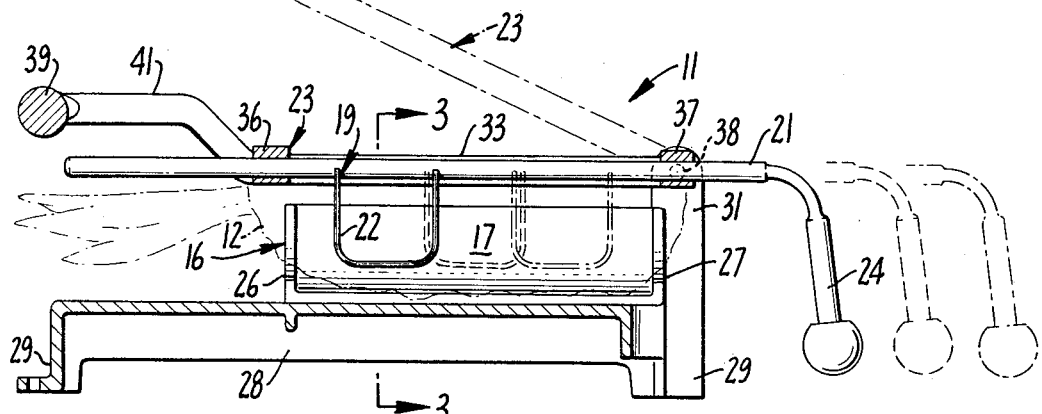
FIGURE 2, a cross-sectional view of the device shown in FIGURE 1 taken substantially in the plane of line 2—2 thereof.
Figure 3:
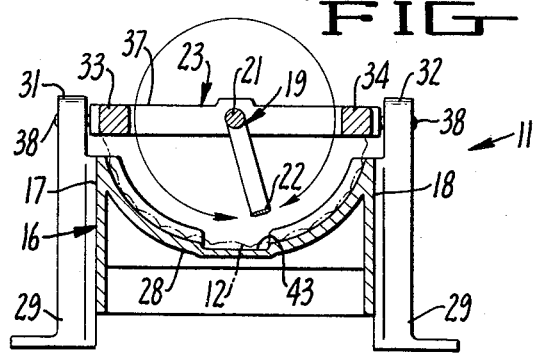
FIGURE 3, a cross-sectional view of the device shown in FIGURES 1 and 2 taken substantially in the plane of line 3—3 of FIGURE 2.

Referring to the drawing in greater detail and particularly to FIGURES 1 through 3, there is shown a machine 11 for dishing a pineapple half 12 or the like by removing pieces of pineapple such as piece 13 and leave a hollow 14 in the pineapple. The machine comprises a cradle 16 having side walls 17 and 18 defining a concave configuration adapted to receive a pineapple half cut through the longitudinal axis thereof. The machine also comprises a cutter 19 having an elongated member 21 and a substantially U-shaped cutting blade 22 attached at a central portion to the elongated member 21. The cutter 19 is carried in cutter mounting means or frame 23 so that the elongated member 21 is adapted to fit substantially in the long axis of the pineapple half when the machine is in operative position, with the frame being carried on the cradle in such a way that it may be moved between an operative position and an out-of-the-way position suitable for placement of pineapple halves in the cradle and removal of same. In order to provide rotary and axial movement to the cutter, means in the form of a handle 24 is provided for the purpose.

The embodiment of FIGURES 1 through 3 shows a simple preferred cutter constructed according to the invention in which the cradle is formed with fixed sidewalls 17 and 18 and the concave section defined thereby is not made to be adjustable. However, it will be appreciated that adjustments to smaller sizes could be made by addition of suitable shims or the like. As there shown, the cradle 16 has endwalls 26 and 27 formed with large circular openings so that the head and foot ends of the pineapple can extend from the concave receiving portion of the cradle. The walls are integrally mounted with a base 28 having foot members 29 integral therewith for providing attachment and anchoring of the unit on a table or the like. At one end of the cradle, a pair of upstanding posts 31 and 32 are provided for holding the frame 23.

As here shown, frame member 23 is generally rectangular and comprises side members 33 and 34, cross member 36, and end member 37. The end member 37 extends between the posts 31 and 32 and is pivotally attached thereto through suitable pins 38 so as to allow the frame to swing from an operative position to an out-of-the-way position, while being carried securely to the cradle. At the end opposite the pivot, a handle 39 is provided which is formed between extensions 41 and 42 of side members 33 and 34. As here shown, the extensions are bent upwardly so that the handle will be out of alignment with the generally rectangular frame. This will enable the user to grasp the handle 39 while sliding member 21 axially without danger of injuring his hand on the projecting end of member 21. In other words, the raised handle provides a safety clearance.

As here shown, the elongated member 21 is in the form of a rod which is held in close fitting relation through suitable bores in cross member 36 and end member 37 so as to allow for both axial movement and rotational movement of the rod 21. The cutter blade 22 is attached to rod 21 by welding or other means at the upper end of the sides of the U so as to provide the bottom portion in substantially parallel configuration to the axis of rotation. While the embodiment of FIGURE 1 shows this integral attachment, it will be obvious from the modifications shown herein that removable attachments can also be used, if desired. The handle 24 is simply an extension of the rod 21 bent and formed into a convenient configuration for manual use.

In the operation of the device shown in FIGURES 1 through 3, a pineapple is first halved by cutting through the longitudinal axis thereof to produce a pineapple half 12. The operator then grasps the handle 39 of frame 23 and lifts it to the position shown in phantom in FIGURE 2 so that the pineapple half 12 may be inserted into the cradle as shown in phantom in FIGURE 2. The frame is then moved down into operative position so that the side members 33 and 34 of the frame securely abut the upper surface of the pineapple half as best seen in FIGURE 3. Rod 21 will also be pushed along and into the core of the pineapple so as to lie substantially coaxially with the pineapple. Due to the softness of the pineapple, it is fairly easy for the operator to push this rod down into the core to the degree necessary and effect the desired position.

With this operation completed, it is seen that the pineapple is securely held in position and handle 24 may be rotated so as to rotate cutter 22 through the pineapple. As best seen in FIGURE 3, the cradle 16 may be provided with a groove 43 to provide additional gripping on the pineapple and positively resist rotation of the pineapple as the cutter 22 is rotated.

The cutter is then rotated by hand as shown by arrow 44 of FIGURE 1, and with the cutter positioned as shown in FIGURE 1, a hollow 14 is provided substantially as shown in the pineapple half of FIGURE 1 and a piece 13 is cut away. If desired, the piece 13 can be removed and other pieces cut out by moving the cutter axially and then rotating it as desired. It will also be appreciated that piece 13 could be left in and held by the operator so as to cut the disc thereof in half again if desired. It will also be appreciated that after the initial piece 13 is cut out, thicknesses of the half-discs cut away may be adjusted by the degree of axial movement of the cutter. By this procedure, the desired hollow may be cut into the pineapple half so to convert the pineapple half into the desired dish, and at the same time pieces of pineapple may be provided for further processing or immediate serving.

From the foregoing description, it is apparent that the modification shown in FIGURES 1 through 3 illustrates a comparatively simple machine which is easily constructed, and substantially foolproof in operation. It will also be appreciated that this modification will provide an inexpensive basic unit suitable for kitchens which dish pineapples, but which do not have the volume of business to justify any great expense in such a machine.

It will also be appreciated that the device shown in FIGURES 1 through 3 may be modified in several ways in order to increase its versatility, and that certain of the modifications are relatively simple. For example, the cutter 22 can be replaced by removable cutters or other elements and FIGURE 4 through FIGURE 8 show alternate forms of removable cutters together with a corer that may be utilized either in the embodiment of FIGURE 1 or modifications thereof.

Referring more particularly to FIGURE 4, there is shown a cutter 19a which comprises a sleeve 46 sized to slide over rod 21 and to be secured thereto by set screw 47. A substantially U-shaped cutter blade 22a is secured rigidly to the sleeve 46 through its sides so that its base 28a is substantially parallel to the axis of the sleeve on the opposite side of the cutting blade 22a, another cutting blade 48a is provided for coring. The cutter blade 48a is also substantially U-shaped but shallow and may be made integral with the cutting blade 28a as shown in FIGURE 4.

In operation, the device shown in FIGURES 1 through 3 will be utilized but with the cutter blade 22 removed. With this blade removed, rod 21 may be pulled axially so that its end clears cross member 36 and the sleeve 46 fits over the end thereof. Rod 21 is then replaced and the sleeve 46 secured by fastening set screw 47. A pineapple is inserted and cut in the manner described above to provide a cut piece 13a having the core 49 also cut.

FIGURE 8 illustrates a cutter 19b which is similar to the cutter 19a except that its cutter blade 48b is located on the same side of the sleeve 46b as is cutter blade 28b. In addition, the cutter blade 48b has the length of its U in common with a portion of the legs of the U-shaped cutter 28b. The operation and results of this cutter are similar to the operation described in connection with FIGURE 4, and the modification is shown simply to show that relationship of position between the core cutter blade and main cutter blade may be varied.

FIGURE 5 illustrates an attachment that may be utilized in place of the cutter shown in FIGURES 4 and 8, with the attachment provided for coring. Thus, FIGURE 5 shows a corer 51 having a sleeve 52 adapted to fit over the rod 21 and secured thereto by setscrew 53. The sleeve has a pair of relatively thin rings 54 and 56 secured thereto and reinforced by plates 57 extending between the rings and the sleeve with the plate oriented radially from the sleeve.

In operation, the corer is brought down on the pineapple half when the frame 23 is also brought down on the pineapple and the relatively thin rings 54 and 56 and the sharp edge of plate 57 cut into the core. The handle 24 is then operated axially to pull the rings through the pineapple in the area surrounding the core so as to cut from the pineapple two strips, constituting a substantially semicylindrical core portion. End cuts are made into this semicylindrical cut by insertion of the rings and by removal of same. In this way, a pineapple half may be decored, if desired, prior to being cut for dishing.

FIGURES 6 and 7 show an alternate form of cutting blade which is especially designed to make the cutting operation easier. This cutting blade 22c also comprises a sleeve 46c and a U-shaped cutting blade 28c. However, it will be noted that the cutting blade 28c is offset or staggered so that first one side of the blade enters the pineapple, then the base portion of the U-shaped blade 28c progressively enters the pineapple, and finally the other side of the U enters the pineapple. With this configuration, the blade is efficient in its slicing action and this action through the fibrous tissue allows smoother, more attractive cuts to be made. The embodiment of FIGURES 6 and 7 also illustrates further how the cutting blade may be modified without departing from the spirit of the invention.

As indicated above, the embodiment of FIGURES 1 through 3 is constructed for simplicity. However, it may be desirable to provide a machine according to the invention which may be adjusted to accommodate the different sizes of pineapple. FIGURE 9 shows an alternate construction for the embodiment of the machine shown in FIGURES 1 through 3 in which the cradle provides an adjustable concave configuration, and the embodiment of FIGURE 10 shows how the side members of the frame may be adjusted to adjust the overlap of the frame members on the opposite sides of the upper face of the pineapple half while the pineapple is in position. It will be appreciated that one or both the embodiments could be incorporated into the machine shown in FIGURES 1 through 3 if desired.

Referring more particularly to FIGURE 9, there is shown a machine 11d comprising a cradle 16d which is made adjustable as to width. In this form, the sidewalls 17d and 18d are constructed in separate sections and movably carried on the main base of the machine. The base is integral with post 31d and 32d and includes suitable side frames which are preferably integrally formed therewith the base. As here shown, the frame includes a pair of L-shaped members 61 and 62 extending the length of the machine and providing a support for the members 63 and 64 which are formed with sidewalls 17d and 18d respectively. Each member 63 and 64 is secured against axial movement on the members 61 and 62 by pivot pin 66, with each pivot pin being held by a screw 67. It will be noted that the pivot pins 66 are free to move laterally through slots 68 of memfers 61 and 62.

At the lower end of each of the pins 66, there is provided a nut 69 that is formed to engage right-hand threads 71 and left-hand threads 72 of a shaft 73. The shaft 73 is journaled through the members 61 and 62 and other portions of the frame, if desired, and contains a handle 74 at one end thereof. Rotation of this handle causes the nuts 69 to move either toward or away from each other depending upon the direction of rotation, and to carry their associated pins 66 and the members 63 and 64, respecttively. In this way, the members 63 and 64 may be adjusted as to spacing.

In addition, it should be noted that pivot pins 66 are carried at a central location on each member 63 and 64 so that the members may accommodate a slight pivot to further conform with the surface of the pineapple. It will be appreciated, that this modification has the advantage of providing a secure holding means for a large variety of sizes and shapes of pineapple. In addition, it will be noted that the structure is much more complicated than that shown for the cradle in the embodiment of FIGURES 1 through 3. However, this modification has the advantage of greater versatility and this largely overcomes the disadvantage of being more complicated and expensive. Therefore, the form desired will depend upon the requirements of the user.

The embodiment of FIGURE 9 is constructed with a frame 23d similar to the frame 23 of FIGURE 1, however, the hinge pins pivotally connecting the frame to the posts 31d and 32d are in modified form. As here shown, pin 76 is in the form of a screw with a knurled handle that will engage loosely or tightly into the end of frame 23d so as to provide a hinge in a loose position and a lock in a tight position. Hinge pin 77 is also threaded through post 32d but slides freely through a bore of the frame 23d so as to abut the elongated member or rod 21d of cutter 19d. In this way, hinge pin 77 may be screwed tightly to provide a sort of lock on the rod 21d so as to restrain it against axial movement while at the same time allowing the handle to be rotated. This selective ability is due to the fact that the rotational forces achieved through the handle may override the pressure from pin 77 more easily than axial movement, and allow further control by the operator.

It will be appreciated that other devices could be included, if desired, such as a threaded end for the shaft 19 which might engage a split nut or the like so as to cause the cutter to advance in spiral fashion, with the split nut disengagable for gross axial adjustment. However, it will be appreciated that all of these modifications require further structure and for most uses the simple structures are preferred.

FIGURE 10 illustrates another modfication in which the clamping distance effected by the frame may be adjusted. Thus FIGURE 10 shows a machine 11e having a cradle 16e similar to the cradle 16 of the embodiment shown in FIGURE 1, a frame 23e similar to the frame 23 of FIGURE 1 except that side members 33e and 34e are modified and a cutter 19e is used which is similar to the cutters of the embodiments of FIGURES 4 and 6 through 8.

Side members 33e and 34e are each constructed with a central rod 81 and the block 82 rotatably carried thereon. Each block 82 is rectangular in cross section and has the bore through which rod 81 fits in an off-center position. In this way, the block 82 can be oriented to influence the distance from the gross adjustment of the frame that the engagement of the frame takes place on the top of the pineapple half. In order to hold these blocks 82 in adjusted position, thumbscrews 83 are provided. It will be appreciated that the block 82 may be elongated over a considerable length in order to provide better contact of the pineapple, or that a plurality of shorter blocks could be used, if desired.

From the foregoing description, it is seen that I have provided an easily operated machine for dishing pineapple halves and the like in a rapid and efficient manner and for obtaining neat slices of the fruit and the like removed during dishing. It is also seen that I have provided a relatively simple and inexpensive machine that may be used as is, or modified to provide greater versitility, as desired.

I claim:

1. A machine for dishing pineapples and the like comprising a cradle having walls defining a concave configuration adapted to receive a pineapple half cut through the longitudinal axis thereof, a cutter having an elongated member and a cutting blade in the form of a loop attached to the elongated member, cutter mounting means carried on the cradle for movement between an out-of-the-way position suitable for placement of pineapple halves in the cradle and removal of same and an operative position in which the elongated member of the cutter lies substantially along the longitudinal axis of a pineapple half lying in the cradle, and means for rotating the elongated member of the cutter whereby the cutting blade may be moved in circular fashion through the pineapple and cut out a piece therefrom, said cutter mounting means being formed with two aligned holes having bearing surfaces and the elongated member being formed with conforming cylindric surfaces fitting through said holes to allow both rotational and axial movement of said member.

2. A machine for dishing pineapples and the like as defined in claim 1, in which the cutting blade is substantially U-shaped with the sides thereof being formed for rotation with the elongated member and oriented in planes substantially perpendicular to the long axis thereof.

3. A machine for dishing pineapples and the like as defined in claim 1, in which the cutter mounting means is formed with a handle disposed substantially outside the axis of the elongated member.

4. A machine for dishing pineapples and the like as defined in claim 2, in which the cutter blade is constructed with a hollow member formed to fit over the elongated member in telescoping relation, and securing means for holding the cutter blade in fixed relation to the elongated member.

5. A machine for dishing pineapples and the like as defined in claim 1, in which the cradle is formed in a plurality of sections and has adjusting means associated therewith for providing different sized concave configurations to fit different sized pineapple halves.

6. A machine for dishing pineapples and the like comprising a cradle having walls defining a concave configuration adapted to receive a pineapple half cut through the longitudinal axis thereof, a cutter having an elongated member and a cutting blade in the form of a loop attached to the elongated member, cutter mounting means carried on the cradle for movement between an out-of-the-way position suitable for placement of pineapple halves in the cradle and removal of same and an operative position in which the elongated member of the cutter lies substantially along the longitudinal axis of a pineapple half lying in the cradle, and means for rotating the elongated member of the cutter whereby the cutting blade may be moved in circular fashion through the pineapple and cut out a piece therefrom, said cutter mounting means including a frame pivotally attached to the cradle at one end thereof and formed to fit over a pineapple half carried in the cradle and abut the pineapple at two sides thereof.

7. A machine for dishing pineapples and the like as defined in claim 6, in which the frame contains adjustable members for abutting the pineapple half whereby different sized pineapples may be held securely by said adjustable members.

8. A machine for dishing pineapples and the like as defined in claim 1, in which the cutting blade is formed to cut out a portion of the core of a pineapple.

9. A machine for dishing pineapple and the like comprising a cradle having walls defining concave configuration adapted to receive a pineapple half cut through the longitudinal axis thereof, a cutter having an elongated rod and a substantially U-shaped cutting blade attached to the rod through the upper portion of the U of the cutting blade, a frame for rotatably carrying said rod and formed to fit over the cradle in abutting relation to the cut side of a pineapple half carried therein, said frame being pivotally carried on the cradle for movement between an out-of-cutting blade in a circular fashion through a pineapple half in the cradle and removal of same and an operative position in which the rod of the cutter lies substantially along the longitudinal axis of the pineapple half located in the cradle, and a handle on said rod for rotating the cutting blade in a circular fashion through a pineapple half carried in the cradle.

10. A machine for dishing pineapples and the like as defined in claim 9, in which the cutter mounting means is formed with a handle disposed substantially outside the axis of the elongated member.

11. A machine for dishing pineapples and the like as defined in claim 9, in which the cutter blade is constructed with a hollow member formed to fit over the elongated member in telescoping relation, and securing means for holding the cutter blade in fixed relation to the elongated member.

12. A machine for dishing pineapples and the like as defined in claim 9, in which the cradle is formed in a plurality of sections and has adjusting means associated therewith for providing different sized concave configurations to fit different sized pineapple halves.

13. A machine for dishing pineapples and the like as defined in claim 9, in which the frame contains adjustable members for abutting the pineapple half whereby different sized pineapples may be held securely by said adjustable members.

14. A machine for dishing pineapples and the like as defined in claim 9, in which the cutting blade includes a first blade formed to make deep cuts into a pineapple, and a second blade formed to make shallow cuts for removal of the pineapple core material.

References Cited

UNITED STATES PATENTS

| | | | |
|---|---|---|---|
| 1,378,258 | 5/1921 | Manderfield | 146—106 |
| 1,769,654 | 7/1930 | Spencer et al. | 146—52 X |
| 2,075,750 | 3/1937 | Pease | 146—52 |
| 2,242,241 | 5/1941 | Ewald | 146—52 |
| 2,675,842 | 4/1954 | Silzle | 146—52 X |
| 3,305,071 | 2/1967 | Anderson | 146—52 X |

W. GRAYDON ABERCROMBIE, Primary Examiner

U.S. Cl. X.R.

146—52, 95, 106